United States Patent

[11] 3,602,145

| [72] | Inventor | John C. St. Clair<br>Box 216, R.R.5, London, Madison, Ohio 43140 |
|---|---|---|
| [21] | Appl. No. | 816,713 |
| [22] | Filed | Apr. 16, 1969 |
| [45] | Patented | Aug. 31, 1971 |

[54] AIR-LIQUID CUSHIONED WHEELS FOR SUPPORTING EXTREMELY HIGH VELOCITY VEHICLES
1 Claim, 2 Drawing Figs.

| [52] | U.S. Cl. | 104/1, 104/154, 115/19 |
|---|---|---|
| [51] | Int. Cl. | B60v 3/06 |
| [50] | Field of Search | 104/1, 154, 162, 163, 19, 148, 23 FS; 115/49, 53, 19 |

[56] References Cited
UNITED STATES PATENTS

| 326,198 | 9/1885 | Bridewell | 104/154 |
| 1,845,495 | 2/1932 | Hanna | 115/53 |
| 3,077,174 | 2/1963 | Cockerell | 115/53 |
| 2,251,334 | 5/1966 | Beardsley | 155/49 |
| 3,013,505 | 12/1961 | Burke, Jr. | 104/23 (FS) |

Primary Examiner—Arthur L. La Point
Assistant Examiner—Richard A. Bertsch

ABSTRACT: Wheels capable of supporting vehicles at velocities from 100 to 800 miles per hour with little loss of power are made with 0.25 inch square shallow cups on the treads. The wheels rotate at the speed of travel practically eliminating shear stresses between the wheel tread and the water in a trough a wheel has as a track. The cups press down on the water but air is trapped in the cups which acts as a cushion to prevent excessive pressures on the water at points which cause power losses.

PATENTED AUG 31 1971

3,602,145

INVENTOR.
John C. St. Clair

AIR-LIQUID CUSHIONED WHEELS FOR SUPPORTING EXTREMELY HIGH VELOCITY VEHICLES

There has been much work done by others on the design of vehicles that can travel at high speeds on the ground to carry people. I have solved the problem of getting large quantities of power very cheaply to high speed vehicles by the use of my U.S. Pat. No. 3,431,742 on a switch which provides a very cheap way to convert direct current to alternating current, and alternating current to direct current. By this I make alternating current with a frequency of 240 to 500 cycles per second. (My switch lets current flow or turns it off by varying the distance between electrodes in a water solution of NaOH. One should not try to do too good a job on the switch or its capacity will be greatly reduced. Using slightly warm cooling water and particularly using electrodes that are not too smooth very materially increase the capacity of the switch in the referred to invention.) Then this high frequency current made by the switch is used to energize a coil along the side of the track of the moving vehicle and when a coil, carried by the vehicle, passes the energized coil the second coil picks up current by transformer action. This high frequency current is very good for operating a lineal induction motor that, as proven by others, is very good at propelling the vehicle without the motor touching the track.

However a very serious problem that has not been solved by others is the problem of how to support vehicles at extremely high speeds. Metal wheels running on metal tracks have been found to not be usable under any conditions at speeds over 200 miles per hour. It has been proposed that high speed vehicles float on very large sliding air cushions. However the air cushions have to operate at such low air pressures (to get low power requirements) that they will not prevent undue movement of the vehicles sideways, and up and down, so there is great danger of the vehicle rubbing against the sides and the bottom of the wide U-shaped trough the vehicle preferably travels in. Also the problem of switching a vehicle at high speeds from one track to another is very difficult.

Others have proposed that water tracks be used with what is called hydrofoils. Small wing like plates called foils press into the water at high speeds these small wings give excellent control of the vehicle and provide lift in unlimited amounts. However these foils or wings require enormous amounts of power to pull along over the water at very high speeds.

Hydrofoil and air-cushion vehicles are described in detail in *Standard Handbook for Mechanical Engineers* by Baumeister & Marks, 7th Ed., 1967, McGraw-Hill Book Co., New York, pages 11–69 through 11–75.

In my presently disclosed invention I essentially combine the use of air cushions and hydrofoil support systems retaining the advantages of each. That is I retain the theoretically low power requirements of air cushions when very large supporting air cushions are used close to the ground. Also I retain the very close control of the vertical and sideways travel of the vehicle possible with hydrofoils and the ability to easily switch vehicles from track to track with hydrofoils. But I eliminate the dangerous vertical and sideways instability of the previous air-cushion support system at low power requirements and I eliminate the very high power requirements of hydrofoils at very high speeds.

In my presently disclosed invention I use a trough of water as a track. This water preferably has its density raised to 50 percent higher than normal by adding potassium carbonate. Perfluorinated hydrocarbons have a density of almost twice that of water and are even better where a very large number of vehicles passing each day will justify the high cost of a perfluorinated hydrocarbon.

In my presently disclosed invention I also use a number of metal wheels that rotate in the track of liquid, which I will refer to as water, and support the rapidly travelling vehicle. Normally a wheel, free to rotate on its axle, being pulled along over a water filled track will rotate so that the wheel's tread will travel at a velocity so there is practically no relative movement between the thread of the wheel where it touches the water and the surface of the water. In other words there will be very little shear between the tread of the wheel and the surface of the water.

This elimination of shear on the surface of the water greatly reduces the high frictional drag experienced by the wing or foil of a hydrofoil craft on water.

However the use of a smooth surfaced wheel on the water while giving good support has the disadvantage that the rate of acceleration of the water under the wheel is not under good control. (It is to be noted that the use of any wing type structure that is used to support an airplane in the air or a hydrofoil boat in the water operates by the fact that the wing or foil gives the fluid medium in which it operates acceleration downwards. From the law of mechanics, that force equals mass times acceleration, the upward resisting force on a winglike structure can be calculated.) A well designed wing or foil accelerates the fluid medium in which it operates under controlled rates. If the force is too high, at the start, the medium will tend to be pushed ahead of the wing which materially increases the power required to drag the wing or foil through the fluid medium. This search wheel will do.

Therefore I use cups in the surface of the treads of my wheels. These trap air, or whatever gas that is used for the vehicle to operate in, as it rotates. Therefore when the tread of a wheel presses against the surface of the water there will be a thin layer of air between about all of the tread and the surface of the water. This will act as a cushion and, where the pressure of the water against the tread of the wheel tends to get high, the air will compress and reduce the pressure on the water. This is particularly true at where the wheel tread initially touches the water and for a smooth threaded wheel the applied acceleration or force would be the greatest. Instead, at this point, the air compresses and greatly reduces the undesirable very high pressure at this point.

It is to be highly emphasized that at vehicle velocities of above 100 miles per hour and very especially at the desired velocities of 200 to 800 miles per hour that accelerating any appreciable thickness of water takes high forces. Normally the effect of rotating my wheels over the surface of the water will not cause the water's surface to depress by over 0.05 inch with the use of pressures small where the treads first touch the surface of the water but mounting up to over 100 pounds per square inch at the halfway mark of the wheel over a spot in the water. Therefore very shallow air cushions can be used, being in most cases from cups less than 0.08 inches deep. This means that very large loads can be supported by a wheel by sinking the wheel very small depths in the water and a very rigid control of the vehicle can be obtained which is an absolute necessity at very high speeds. Also, since high rates of shear are eliminated, relatively small amounts of power are necessary to rotate the wheels over the surface of the water.

Figure 1:
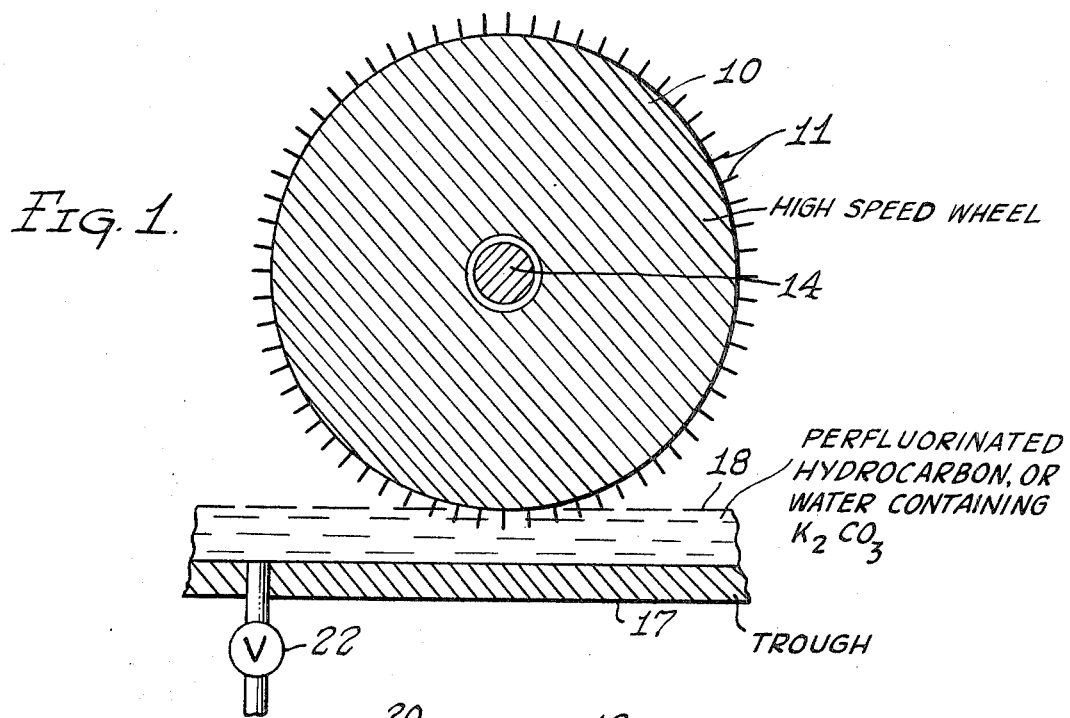
FIG. 1 shows a vertical cross section of my wheel, parallel to all the radii of the wheel, such as may be used for a vehicle to carry a light automobile or a vehicle that is a small bus.
Figure 2:
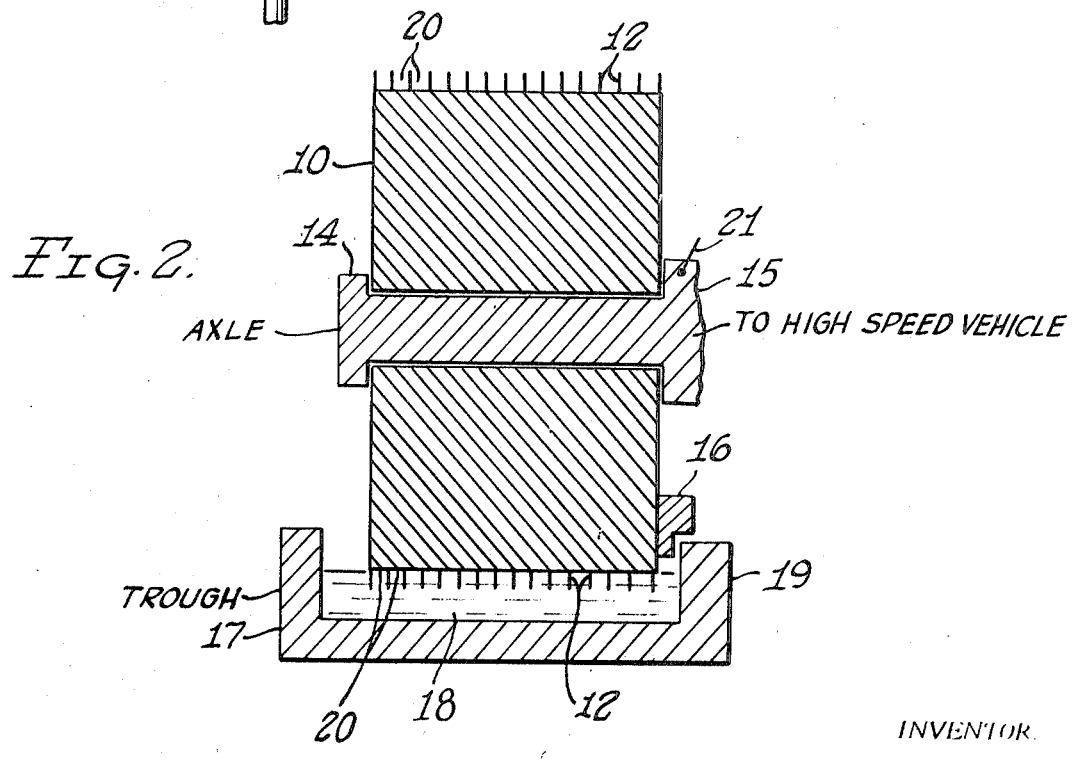
FIG. 2 shows a vertical cross section perpendicular to FIG. 1, on a diameter of the wheel.

Referring to the drawing I show a wheel 10 for supporting a high speed vehicle designed to travel at from 200 to 600 miles per hour. Wheel 10 rotates on axle 14 which is connected to the vehicle by beam 15. The tread of wheel 10 travels in trough 17 which is filled with liquid 18 which may be a solution of $K_2CO_3$ in water. A nearly saturated solution of $K_2CO_3$ in water has a density of 1.5 times that of pure water which provides 1.5 times the lifting power of pure water by the wheel. $K_2CO_3$ will keep the water from freezing without the application of extra heat in about all of the United States. It will also greatly reduce the corrosion of iron by the solution. It will pick up carbon dioxide from the air in amounts that will greatly reduce the corrosion of aluminum alloys in it. However if desired just water may be used or any other liquid that is nontoxic, preferably has a density of at least that of water, is high boiling, has a low freezing point and will not burn. Perfluorinated hydrocarbons have a density twice that of water, are nontoxic, have low freezing points, will not burn and can be selected with very high boiling points and are preferable where a very high usage of the track permits the use of such high cost liquids. Liquid is introduced in trough 17 by valved pipe line 22.

The tread of wheel 10 is covered with small cups. In this case the cups are square in cross section and are made from thin walls 11 which are parallel to the axle of the wheel and thin walls 12 which are parallel to the wheel itself. The walls of these small cups may be put under high centrifugal stresses by the rotation of the wheel, especially when the vehicle travels at over 300 miles per hour. However it is relatively easy to make the walls of the cups integral with the wheel. This is done by making a solid wheel out of a forging as for example from a high strength alloy of aluminum which is latter heat-treated. Then the cups are hollowed out from the tread of the wheel by the method called electrochemical machining in which by putting a properly shaped electrode near the surface of the wheel and passing electrical current between the wheel and the electrode, while a solution of salt water rapidly passes between the wheel and the electrode, any shape of a cavity can be cheaply made in the tread.

As the wheel rolls along with the liquid-filled trough acting as its track the small cups will entrap air, or any other gas that the wheel operates in, before the cups are submerged in the liquid (which I will call water) in the trough. As a result the bottoms of the cups will not contact the surface of the water. Instead a cushion of air will be between the water, pushed down on, and the bottom of the cup. It is not necessary to prevent all the bottoms of all the cups from touching the surface of the water. All is needed is that there be gas in a cup when a cup presses down against the surface of the water. This provides a cushioning effect that prevents the necessity of extremely high pressures when a smooth threaded rotating wheel first touches the surface of water it is passing over. (It can be said that in the design of foils for hydrofoil boats previously referred to that it is difficult to design foils that will not have very undesirable very high initial leading edge pressures if the foil is not operated at the exact velocity for which it is designed, with the exact load for which it was designed for and the water is perfectly smooth.) A big advantage of my wheels is that they will operate efficiently over a wide range of high speed operation and individual wheel loadings.

A point to watch is that in the compression of the air, or other gas, by the cups of the wheel that if relatively high loadings are used the pressure will rise up to over 100 pounds per square inch gage pressure under the cups and through this pressure only occurs for times of the order of 1/3000 of a second and the temperature of the gas for this period of time will rise. While the conditions of heat transfer between the compressed gas and the metal bottom of the wheel are poor, the hot gas may increase the temperature of the metal of the bottoms of the cups to a higher degree than desired inspite of the cooling effect of the water on the walls of the cups where heat transfer is very good. Therefore I prefer to coat the bottoms of the cups with some insulating material like a thin layer of a heat resistant plastic glue. The plastic glue will greatly slow down the rate of heat transfer to the metal. This I show at 20.

Now of course where the lives of people depend on the operation of equipment the equipment must be made perfectly safe and foolproof. For example if the liquid supply system for the trough 17 fails there is provided rim 16 on the wheel 10 for the wheel 10 to rotate on solid metal track 19, which is an enlarged wall of trough 17. If the axle and bearing of the wheel fails they will first overheat and this will be detected by temperature sensing device 21. For horizontal troughs and where a smooth ride is required with the highest safety I prefer to use separate troughs for the front and rear wheels on a side to travel on.

The wheel illustrated in the drawing is designed to hold up a corner of a vehicle and keep it from moving downward. It is also necessary to keep a vehicle from moving from side to side. This is done by another set of wheels, like that shown, except that they rotate against water flowing down a wall. The wall should not be completely vertical and this will make the water flow solidly against the wall. There will be small ripples on the surface of the water and as a result the cups should be about twice as deep as those used for the cups used for vertical support of the vehicle. This will result in less force supplied against the nearly vertical wall but much less force will be needed.

An important advantage of my wheels is they permit the close control of a very rapidly traveling vehicle that is necessary if a vehicle is to be switched off of a given track, on which the maximum capacity of very rapidly traveling vehicles are traveling, without slowing down the to-be-switched vehicle before it leaves the given track. This slowing down has the result that all the vehicles on the track have to be also slowed down with the result that the capacity of the track is decreased. It is to be highly emphasized that the cost of a track within a tunnel or an elevated track, as is necessary for operation near and in cities, is very very expensive and the ability to operate tracks with a very high density of vehicles is very advantageous for operating buses and is absolutely necessary if automobiles are to be cheaply carried at high speeds. It is to be noted that I am the first to propose that automobiles be carried at extremely high speeds on any type of road.

It is to be noted that conditions other than the operation of the tread of the wheel will limit the speed of vehicles using my wheels to carry them. The biggest limiting condition will be the friction of the air on the vehicle. At 400 miles per hour the force of the air against the vehicle becomes quite large and effectively limits the travel of even efficiently streamlined vehicles to this speed. For trips of over 200 miles, and especially for buses, it will be advantageous to operate the vehicles in a tunnel filled with 83 percent helium and 17 percent oxygen, which people can live in quite normally. This will permit speeds of 800 miles per hour. In this case the effect of centrifugal force on the wheels at extremely high speeds must be closely watched and the methods worked out by others for the calculating of stresses on rotating disks must be used. The limit caused by stresses in the disk or wheel is about 800 miles per hour which is also about the limit set by helium-oxygen gas friction as noted above. Small diameter wheels give good operation at very high speeds and can be made with increased thickness at the axle, which increases the centrifugal force caused by high speeds that can be withstood safely. It is to be noted that change of air to a gas that has a lower molecular weight and hence produces lower drag on the vehicle does not affect the performance of the wheel in carrying its load. However the use of vacuum in the tunnel that the vehicle travels in will require deeper cups on the treads of the wheel to catch enough of the rarified gas to produce a desired load carrying ability. However the operation of vacuum systems otherwise presents so many problems it is believed that vacuum systems will never be used.

Example

Design one of the 4 wheels supporting a small bus which with its passengers weighs 3000 pounds. This makes the normal load to be 750 pounds per wheel. Each wheel must be designed to carry a load of twice the normal load but not necessarily with a high efficiency when overloaded. Design the minimum cruising speed to be 250 miles per hour.

Use a 1-foot diameter wheel that has a 8-inch wide tread. When the wheel sinks in the water one-sixteenth inch the length of the arc of the tread in the water is 1.5 inches. The tread area pressing down on the water (but separated by an air cushion in the cups) is 12 square inches. Therefore for normal operation the average pressure must be 750/12=62.5 pounds per square inch on the water.

The effect of acceleration can be averaged over periods of time without much error and we can figure that the water will be accelerated by an average pressure of 62.5 pounds per square inch for the time necessary for the wheel to roll at 250 miles/hour over it or a time of 1/3000 seconds. The amount of water solution containing 50 percent by weight $K_2CO_3$ and having a specific gravity of 1.5 will be a layer of at least two-thirds inches deep or one-thirtieth pound per square inch. and in the center words one-thirtieth pound will be acted on for 1/3000 second by an average force of 62.5 pounds. From mechanics $$F = ma/32$$

where $F$ = force in pounds
$m$ = mass acted on in pounds
$a$ = resulting acceleration in feet/second$^2$
32 = acceleration due to gravity Therefore $a = 60,000$ feet/second$^2$ With a time of 1/3000 second the water will reach a velocity of 20 feet/second, and will have an average velocity of 10 feet/second. In 1/3000 second the water will be depressed 1/300 foot or 0.04 inch while the wheel rotates over it. The above depression of the water will be twice as much if the load is doubled.

Now the above depression of 0.04 inches for normal operation is a maximum figure since the layer of water moved is obviously over two-thirds inches deep. It can be found by the above calculation method that the depression of the surface of the water is inversely proportional to the square of the vehicle velocity. Therefore at 400 miles/hour the depression for the normal load will be a maximum of 0.016 inches or in other words the water will be extremely resistant to pressure on top of it by a very rapidly moving wheel.

In actual operation of course the pressure on the water will at most points under the wheel not be at the average pressure. But we must remember that a pressure twice the average pressure but for half the time or length of travel of the tread on the water surface will support the same weight and cause the same movement of water as the conditions assumed above. That is the use of the average pressure over the whole tread area on the water is proper. The important question is whether at places where the pressure is above average does the pressure affect as great a depth of water as I have assumed for my average conditions. It is to be emphasized that less power will be wasted if the pressure of the tread has to accelerate the most water. This makes the depression of water by the wheel less. The answer to the above question is very definitely yes since my above-average-pressures in actual operation are not at the initial or final edges of the arc of the tread touching the water but at the center of the arc. Therefore actual operation will be more efficient than the assumed case in the calculations.

The power loss produced by causing a layer of water plus $K_2CO_3$ that is two-thirds inches deep and 8 inches wide to acquire a velocity of 20 feet/second is calculated from the kinetic energy in this layer. This layer has a weight of 3.2 pounds per lineal foot or 16,800 pounds per mile. Or for four wheels for vertical support and four wheels for sideways balancing with one-half width of track this is 100,000 pounds per mile with a kinetic energy of 6.2 foot-pounds per pound. This makes the power loss per mile about 0.25 kilowatt hours of power which is negligible compared with the air friction on the body of the vehicle which is at least 2 kilowatt hours per mile.

Now there is also the friction from pushing the walls of the cups on the tread down into the water at a different horizontal velocity than the stationary water. With 0.25-inch square cups these walls are designed with a wall thickness of 0.025 inches and the edges are streamlined by rounding. The velocity that an edge will initially approach the water surface as it almost touches it, assuming the wheels dip a maximum of one-sixteenth inch in the water finally, is 14 feet/second. The edge has a horizontal velocity relative to the water of 0.3 feet per second. But on the other hand the slope of the edge as it enters the water produces a velocity of the water of 0.6 feet/second in the same direction giving a net relative change of water velocity of only 0.3 feet per second. Since this would require a change of kinetic energy of $(0.3/20)^2$ or 1/4400 of the kinetic energy change of that by 20 feet/second calculated previously to be 0.25 kilowatt hours per mile this change of water velocity due to the difference in velocity of the edge of the cups with that of the water, can be neglected.

Then there is the force required to push the edges of the cups into the water. These edges are designed to be 0.025 inches wide and with 0.25-inch square cups cover 20 percent of the area of the tread. However the edges are streamlined by rounding, the water has places to go and the edges pass through the water at a velocity varying from a maximum of 14 feet per second to a minimum of no velocity at all. Let us assume the edges travel a distance of 0.1 inch in water with an average velocity of 12 feet per second. The velocity head of 12 feet/second is 2.2 feet of water. With a streamlined frontal area a pressure drop of under 1.0 velocity heads is reasonable. Therefore the force downward equals 2.2 feet of water. For the force over 20 percent of the area the force is 0.5 feet of water for 0.2 inches or 5 foot-pounds of work per square foot. For four wheels with treads 8 inches wide and four wheels with treads 8 inches wide but twice as deep penetration the power loss per mile is way under 0.1 kilowatt hours or it can be called negligible.

Then there is the power loss possible with the compression of the air under the inverted cups. The only way for an air power loss to occur is for the gas to be compressed at a higher temperature than it is expanded. This would be difficult since in the cup the opportunity for heat transfer is small, especially since I prefer to insulate the bottoms of the cups. Splashing could cause heat transfer of heat to the water. But it is to be emphasized that the time that the cup is above a point on the surface of the water is only 1/3000 second and this is very short compared to the possible velocity of splashes so that much contact of splashes with the compressed air is impossible unless the water surface is initially rough. Even in this case the cooling effect of splashes on the water being compressed should be considerably canceled by a warming effect of the same splashes on the air as it is expanded.

However I have calculated the greatest loss of power possible from air compression by assuming that there is the maximum power used to compress the air, that is the air is compressed without cooling, and then the air by some means is then cooled to 60° F. by the water. Then the air is expanded without contact with the water so that it expands with the minimum possible power recovery.

Assume the air is compressed to 165 pounds per square inch gage pressure which is more than the maximum pressure possible for under the wheel if the water is smooth. Assume the air is at a temperature initially of 60° Fahrenheit. The cups are designed to be 0.0625 inches deep. For eight wheels the air compressed per mile is 144 cubic feet. In compressing the air to 165 pounds per square inch gage pressure the temperature of the air will rise to 580° Fahrenheit for perhaps 1/10,000 of a second and there will be required 0.41 kilowatt hours of work required per mile. Then by some unknown, but theoretically possible, way the air is cooled to 60° Fahrenheit in 1/100,000 of a second before the air is expanded. The air on expansion will have its temperature drop to 200° Fahrenheit below zero. (I do not know how that this can be done but it is theoretically possible.) This expansion will recover 0.20 kilowatt hours of work per mile. Therefore the net power loss theoretically possible is 0.21 kilowatt hours per mile.

Therefore the total power losses of my wheel at 250 miles per hour for a set of eight for a 3000-pound bus using my wheels on a smooth water surface are definitely under 0.6 kilowatt hours per mile. When we consider that the air friction on the vehicle will be of the order of 2 kilowatt hours/mile and consider that electric power is a relatively cheap source of power compared to gasoline, this is very acceptable figure for the suspension system permitting the driving of the bus at very high speeds. The above figure of 0.6 kilowatt hours/mile maximum for the suspension system will only very slowly increase with increase in speed.

If use of the wheels over rough water is expected, to provide smooth riding larger diameter wheels and cups two to three times the depth of that above would be used.

For a load of twice the normal amount on my wheel in the preceding example the wheel will be depressed slightly more in the water and pressures on the water directly under the wheel will be nearly double. However the wheel will operate fairly efficiently since the high pressures are at and near the center of the arc of the tread pressing down on the water, and not on the edges, as previously shown for normal operation. Power losses will be of the order of three times that of normal operation. It is to be noted that if a load of twice normal were to be used all the time it would pay to use a wheel that is slightly larger in diameter and width and have deeper cups.

In conclusion I may say that I have disclosed a wheel capable of supporting vehicles at speeds as high as 800 miles per hour with relatively small losses of power as compared to the present limit of 200 miles per hour that is achievable by regular wheels only under special cases. My wheels provide the very close guidance of a vehicle that is so advantageous to very high speed vehicle travel and is absent from prior proposed methods of supporting very high speed vehicles. My wheel's close guidance of the supported vehicle permits switching a very rapidly moving vehicle off a track carrying the maximum capacity of vehicles without slowing down the other vehicles, thus permitting a much larger number of vehicles to travel a single track than previously possible. My wheels do not require a heavy fan and motor to be mounted on the vehicle, like air-cushioned vehicles proposed by others. Air-cushion vehicles also work very inefficiently when helium-oxygen mixtures are used in a track through a tunnel.

Obvious details have not been shown in the drawing. For example the method of supporting trough 17 is not shown. Also if the liquid in the trough is valuable, means to recover any splashes from trough 17 should be used. An axle is given the definition given by Webster's Dictionary as "The pin or spindle on which a wheel revolves, or which revolves with a wheel."

For a wheel to revolve freely on an axle is given the definition of revolving without power being given to the wheel by means of the axle, as is illustrated in the drawing.

I claim:

1. The combination of a vehicle and a support track, the vehicle including a wheel with a tread comprising a plurality of cups, each cup defined by longitudinally and transversely extending vane members, and each cup having an open end pointing away from the axle of the wheel, said support track comprising a liquid containing trough having lateral sidewalls and acting as a track for the wheel to travel on and forming the primary support for said vehicle when traveling at high speeds, and said wheel further including a safety rim engageable with the wall of the trough upon failure of the primary support means.